(12) United States Patent
Heieie

(10) Patent No.: US 8,571,709 B2
(45) Date of Patent: Oct. 29, 2013

(54) REMOTE CONTROLLED VEHICLE

(75) Inventor: John M. Heieie, Maricopa, AZ (US)

(73) Assignee: Southeast Directional Drilling, LLC, Casa Grande, AZ (US)

( * ) Notice: Subject to any disclaimer, the term of this patent is extended or adjusted under 35 U.S.C. 154(b) by 459 days.

(21) Appl. No.: 12/898,148

(22) Filed: Oct. 5, 2010

(65) Prior Publication Data

US 2012/0083944 A1   Apr. 5, 2012

(51) Int. Cl.
F16L 1/00 (2006.01)

(52) U.S. Cl.
USPC .............. 700/245; 138/97; 405/184

(58) Field of Classification Search
USPC ............ 138/97, 98; 175/53, 61, 62; 180/65.1, 180/65.22; 405/184, 184.1, 184.2, 184.4, 405/184.5; 700/245, 264; 701/2, 22
See application file for complete search history.

(56) References Cited

U.S. PATENT DOCUMENTS

| | | | | |
|---|---|---|---|---|
| 1,933,624 A * | 11/1933 | Guthrie | | 15/104.09 |
| 3,562,836 A * | 2/1971 | Frew et al. | | 15/104.31 |
| 4,384,636 A * | 5/1983 | Hillemacher | | 188/7 |
| 4,637,756 A * | 1/1987 | Boles | | 405/184 |
| 4,679,637 A * | 7/1987 | Cherrington et al. | | 175/61 |
| 4,986,314 A * | 1/1991 | Himmler | | 138/97 |
| 5,311,641 A * | 5/1994 | Matsuura et al. | | 15/406 |
| 5,314,267 A * | 5/1994 | Osadchuk | | 405/184 |
| 5,986,314 A * | 11/1999 | Seshadri et al. | | 257/402 |
| 6,243,483 B1 * | 6/2001 | Petrou et al. | | 382/103 |
| 6,626,447 B2 * | 9/2003 | Nelson et al. | | 280/79.11 |
| 2002/0131825 A1 * | 9/2002 | Finzel et al. | | 405/183.5 |
| 2005/0145415 A1 * | 7/2005 | Doering et al. | | 175/24 |
| 2006/0124360 A1 * | 6/2006 | Lee et al. | | 175/61 |
| 2006/0290779 A1 * | 12/2006 | Reverte et al. | | 348/84 |
| 2007/0052140 A1 * | 3/2007 | Prusak | | 264/516 |

* cited by examiner

Primary Examiner — Khoi Tran
Assistant Examiner — Stephen Holwerda
(74) Attorney, Agent, or Firm — Honigman Miller Schwartz and Cohn LLP

(57) ABSTRACT

A method of directional drilling includes forming first and second pits on corresponding first and second sides of a barrier, forming a pilot bore from the first pit to the second pit, enlarging the pilot bore to a final bore, and extending a cable through the final bore between the first and second pits by attaching the cable to a remote controlled vehicle and driving the remote controlled vehicle through the final bore from one of the pits to the other pit. The method also includes pulling a pipeline through the final bore using the cable.

9 Claims, 15 Drawing Sheets

REMOTE CONTROLLED VEHICLE

TECHNICAL FIELD

This disclosure relates to remote controlled vehicles for negotiating tunnels.

BACKGROUND

Directional drilling (or slant drilling) generally entails drilling non-vertical wells or bores. Typically, directional drilling can be broken into three categories: oilfield directional drilling (e.g., for increasing an exposed section length through a reservoir by drilling through the reservoir at an angle), utility installation directional drilling (or horizontal directional drilling), and in-seam directional drilling (e.g., for coal-bed methane). In the case of horizontal directional drilling, a bore can be formed under a barrier for installation of utilities, such as a pipeline, under the barrier without disturbing the barrier. After the bore is formed, the utility or pipeline needs to be pushed or pulled through the bore. As the operating time of machinery and devices to perform the horizontal directional drilling can be quite costly, an efficient manner of installing the utility or pipeline can be desirable.

SUMMARY

One aspect of the disclosure provides a method of directional drilling. The method includes forming first and second pits spaced from each other, forming a pilot bore from the first pit to the second pit, enlarging the pilot bore to a final bore, and extending a cable through the final bore between the first and second pits by attaching the cable to a remote controlled vehicle and driving the remote controlled vehicle through the final bore from one of the pits to the other pit. The method also includes pulling a pipeline through the final bore using the cable. The remote controlled vehicle can provide an efficient manner for extending the cable through the final bore. Moreover, the remote controlled vehicle can eliminate any need for a human or animal to pass through the final bore.

Implementations of the disclosure may include one or more of the following features. In some implementations, the method includes issuing a drive command from a remote controller external to the vehicle and receiving the drive command in a vehicle controller. The vehicle controller controls a drive system of the vehicle according to the received drive command. In some examples, the remote controller communicates the drive command to the vehicle controller using a radio frequency communication. Other forms of communication are possible as well, such as wireless, Wi-Fi, infrared, laser, etc.

In some implementations, the vehicle controller controls a hydraulic power unit in communication with front and rear hydraulic drives supported on corresponding front and rear portions of a chassis of the vehicle. Each hydraulic drive drives a corresponding mobility element, such as a wheel or track. The vehicle controller may control a motor of the hydraulic power unit to drive a pump in fluid communication with the hydraulic drives. Moreover, in some examples, the vehicle controller controls front and rear control valves in fluid communication with the corresponding front and rear hydraulic drives to regulate at least one of a fluid direction and a fluid flow through each control valve to each corresponding hydraulic drive. Each hydraulic drive may be a hydraulic traction drive.

The method may include attaching the cable to a chassis of the remote controlled vehicle. The chassis may have a length of between about 80 inches and about 160 inches, a width of between about 10 inches and about 30 inches, and a height of between about 10 inches and about 30 inches for moving through tunnels. Furthermore, the remote controlled vehicle may have a center of gravity disposed within a volume having a length of between about ⅛ and about ½ of the length of the chassis, a width of between about ⅛ and about ½ of the width of the chassis, and a height of between about ⅛ and about ½ of the height of the chassis. The volume may be centered and sitting on the chassis.

In some implementations, the method includes forming a pilot bore of between about 6 inches and about 12 inches. Drilling fluid may be delivered into the pilot bore to aid formation of the pilot bore. The pilot bore can be reamed with a rotating reamer to enlarge the pilot bore to the final bore.

Another aspect of the disclosure provides a remote controlled vehicle that includes a chassis, a drive system supported by the chassis and a controller communicating drive commands to the drive system. The controller receives the drive commands from an external communicator. The chassis has a length of between about 80 inches and about 160 inches, a width of between about 10 inches and about 30 inches, and a height of between about 10 inches and about 30 inches for moving through tunnels. Moreover, the remote controlled vehicle may have a center of gravity disposed within a volume having a length of between about ⅛ and about ½ of the length of the chassis, a width of between about ⅛ and about ½ of the width of the chassis, and a height of between about ⅛ and about ½ of the height of the chassis. The volume may be centered and sitting on the chassis.

Implementations of the disclosure may include one or more of the following features. In some implementations, the drive system includes a hydraulic power unit supported by the chassis and front and rear hydraulic drives each supported by the chassis and driven by the hydraulic power unit. The hydraulic power unit may include a motor driving a fluid pump in fluid communication with the hydraulic drives. In some examples, the hydraulic power unit includes front and rear control valves in fluid communication with the corresponding front and rear hydraulic drives for regulating at least one of a fluid direction and a fluid flow through each control valve to each corresponding hydraulic drive.

In some implementations, the drive system further includes front and rear axles rotatably supported by the chassis and driven by the corresponding front and rear hydraulic drives. At least one wheel is coupled to each axle. The drive system and the controller can each be sealed watertight to remain operational while submerged in water. In some instances, the controller receives radio frequency communications from the external communicator.

In yet another aspect of the disclosure, a remote controlled vehicle includes a chassis having first and second supports spaced parallel from each other and extending from a front portion of the chassis to a rear portion of the chassis. A platform is connected between the first and second supports. The remote controlled vehicle also includes front and rear axle supports disposed on the respective front and rear portions of the chassis, a pull cable receiver disposed on the chassis, front and rear axles rotatably supported by the respective front and rear axle supports. At least one wheel is coupled to each axle. The remote controlled vehicle includes a hydraulic power unit supported by the chassis, front and rear hydraulic drives each supported by the chassis and driven by the hydraulic power unit, and a controller communicating drive commands to each hydraulic drive. The controller receives the drive commands from an external communicator.

The hydraulic power unit, hydraulic drives, and controller are each sealed watertight to remain operational while submerged in water.

Implementations of the disclosure may include one or more of the following features. In some implementations, the chassis has a length of between about 80 inches and about 160 inches, a width of between about 10 inches and about 30 inches, and a height of between about 10 inches and about 30 inches for moving through tunnels. The remote controlled vehicle may have a center of gravity disposed within a volume having a length of between about ⅛ and about ½ of the length of the chassis, a width of between about ⅛ and about ½ of the width of the chassis, and a height of between about ⅛ and about ½ of the height of the chassis. The volume may be centered and sitting on the chassis.

In some examples, the hydraulic power unit includes a motor driving a fluid pump in fluid communication with the hydraulic drives. The hydraulic power unit may further include front and rear control valves in fluid communication with the corresponding front and rear hydraulic drives for regulating at least one of a fluid direction and a fluid flow through each control valve to each corresponding hydraulic drive. The controller may receive radio frequency communications from the external communicator.

In yet another aspect, a remote controlled vehicle includes a chassis, front and rear axles mounted on respective front and rear portions of the chassis, and at least one wheel coupled to each axle. Front and rear hydraulic drives are disposed on the respective front and rear portions of the chassis. The front hydraulic drive drives the front axle and the rear hydraulic drive drives the rear axle independently of the front hydraulic drive. The remote controlled vehicle includes front and rear control valves in fluid communication with the corresponding front and rear hydraulic drives for regulating at least one of a fluid direction and a fluid flow through each control valve to each corresponding hydraulic drive. A motor drives a fluid pump in fluid communication with the hydraulic drives and a reservoir is in fluid communication with the fluid pump. A controller communicates drive commands to each hydraulic drive and receives the drive commands from an external communicator. The controller, the reservoir, the motor and the pump are disposed in series along the chassis. The chassis has a width substantially equal to the widest width of the reservoir and the motor.

In some implementations, the reservoir is disposed on the chassis rearward of the controller and forward of the pump and motor. The pump can be disposed on the chassis forward of the motor. In some examples, the chassis has a length of between about 80 inches and about 160 inches, a width of between about 10 inches and about 30 inches, and a height of between about 10 inches and about 30 inches for moving through tunnels. In additional examples, the remote controlled vehicle has a center of gravity disposed within a volume having a length of between about ⅛ and about ½ of the length of the chassis, a width of between about ⅛ and about ½ of the width of the chassis, and a height of between about ⅛ and about ½ of the height of the chassis. The volume is centered and sitting on the chassis.

In another aspect, a remote controlled vehicle includes a chassis, a drive system supported by the chassis, and a controller communicating drive commands to the drive system. The controller receives the drive commands from an external communicator. A width of the chassis is less than or equal to a length of the chassis and a height of the chassis is less than or equal to ⅙ the length of the chassis.

In some implementations, the remote controlled vehicle has a center of gravity disposed within a volume having a length of between about ⅛ and about ½ of the length of the chassis, a width of between about ⅛ and about ½ of the width of the chassis, and a height of between about ⅛ and about ½ of the height of the chassis. The volume is centered and sitting on the chassis.

The drive system, in some implementations, includes a hydraulic power unit supported by the chassis and front and rear hydraulic drives each supported by the chassis and driven by the hydraulic power unit. The hydraulic power unit may include a motor driving a fluid pump in fluid communication with the hydraulic drives. Moreover, the hydraulic power unit may include front and rear control valves in fluid communication with the corresponding front and rear hydraulic drives for regulating at least one of a fluid direction and a fluid flow through each control valve to each corresponding hydraulic drive.

The remote controlled vehicle may include first and second lift arms disposed on a front portion of the chassis and spaced parallel from each other as well as third and fourth lift arms disposed on a rear portion of the chassis and spaced parallel from each other. Each lift arm is configured to support the weight of the remote controlled vehicle. In some implementations, the chassis includes first and second supports spaced parallel from each other and extending from the front portion of the chassis to the rear portion of the chassis. A platform is connected between the first and second supports. Moreover, front and rear substantially U-shaped supports are disposed on the respective front and rear portions of the chassis. The first and second lift arms are disposed on the front substantially U-shaped support and the third and fourth lift arms are disposed on the rear substantially U-shaped support.

In some examples, the drive system includes front and rear axles rotatably supported by the chassis and driven by the corresponding front and rear hydraulic drives. At least one wheel is coupled to each axle.

The controller may receive radio frequency communications from the external communicator. Moreover, the drive system and the controller can be each sealed watertight to remain operational while submerged in water.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 6 is a partial perspective view of the remote controlled vehicle shown in

FIG. 3, illustrating an exemplary controller.

Like reference symbols in the various drawings indicate like elements.

DETAILED DESCRIPTION

Figure 1A:
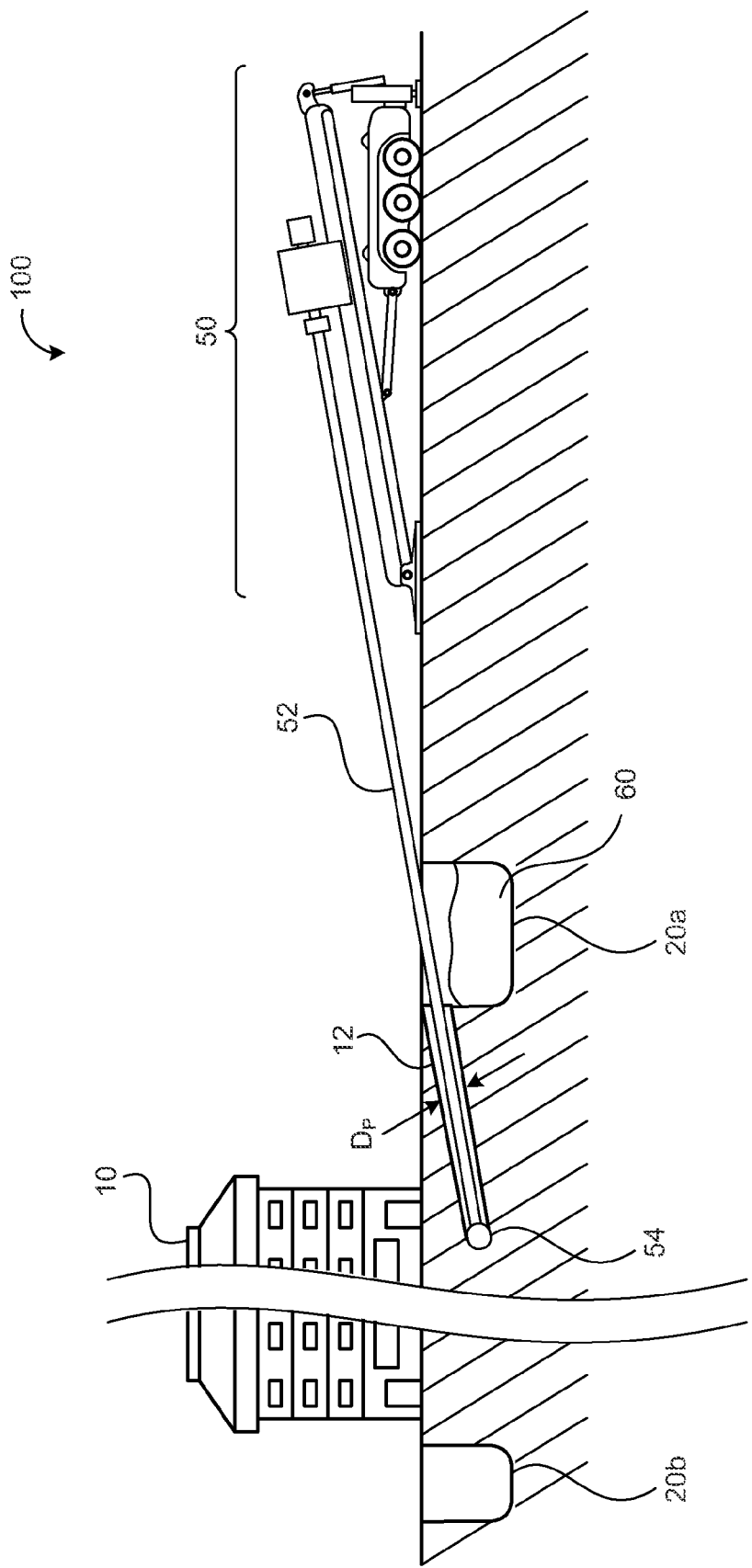
FIG. 1A is a schematic view of an exemplary directional drilling system for installing a pipeline under a barrier.

Directional or horizontal drilling methods can be used to install a pipeline under a barrier such as a highway, road, waterway, building, or other surface obstruction without disturbing the barrier. Examples of horizontal drilling apparatuses and methods of horizontal drilling can be found in U.S. Pat. No. 7,748,471 and U.S. Pat. No. 7,730,969, both of which are hereby incorporated by reference in their entireties.

Referring to FIGS. 1A-1D, a directional drilling system 100 may be used for drilling a pilot bore 12 under a barrier 10, such as a highway, and reaming the pilot bore 12 to a final bore 14 for installing a pipeline 30 therethrough under the barrier 10. FIG. 2 provides an exemplary arrangement 200 of operations for installing the pipeline 30 under the barrier 10. The operations include forming or opening 202 first and second pits or trenches 20a, 20b on either side of the barrier 10 and placing 204 a drilling or boring apparatus 50 on one side of the barrier 10 (see e.g., FIG. 1). The operations further include drilling 206 a pilot bore 12 with the drilling apparatus 50 under the barrier 10 between the two open trenches 20a, 20b. The pilot bore 12 may be formed by excavation by fluid jetting or by a down-hole motor and a drill. Depending on soil conditions, the pilot bore 12 may be formed along a selected path; however, sometimes large obstacles (e.g., rocks) can cause path deviations. In some implementations, the pilot bore 12 has a diameter $D_P$ of between about 6 inches and about 12 inches (e.g., about 9 ⅞ inches), but can vary depending on the soil conditions and size or capacity of the drilling apparatus 50. The drilling apparatus 50 may deliver (e.g., pump) drilling fluid 60 through a drill pipe or stem 52 connected to a drilling head 54 to jet the drilling fluid 60 from the drilling head 54 (e.g., at relatively high pressure) at the site of excavation to aid excavation and formation of the pilot bore 12. The drilling fluid 60 may lubricate the drill pipe 52 and drilling head 54 in addition to suspending the excavated soil, which is brought to the surface as the drilling fluid 60 flows out of the pilot bore 12. The drill fluid 60 can then be recycled and re-injected into the drill stem 52.

Figure 1B:
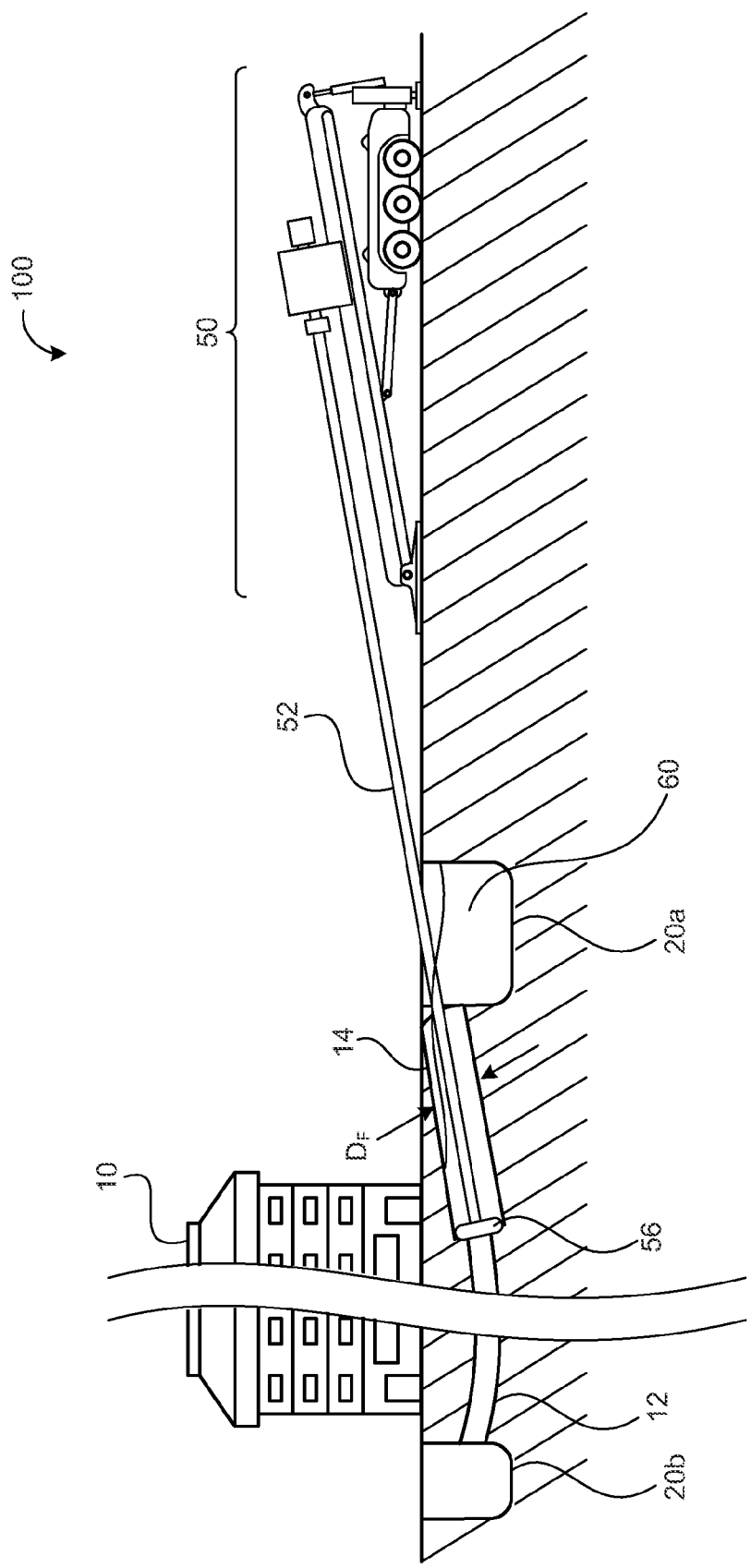
FIG. 1B is a schematic view of an exemplary directional drilling reaming a pilot bore to a final bore.
Figure 2:
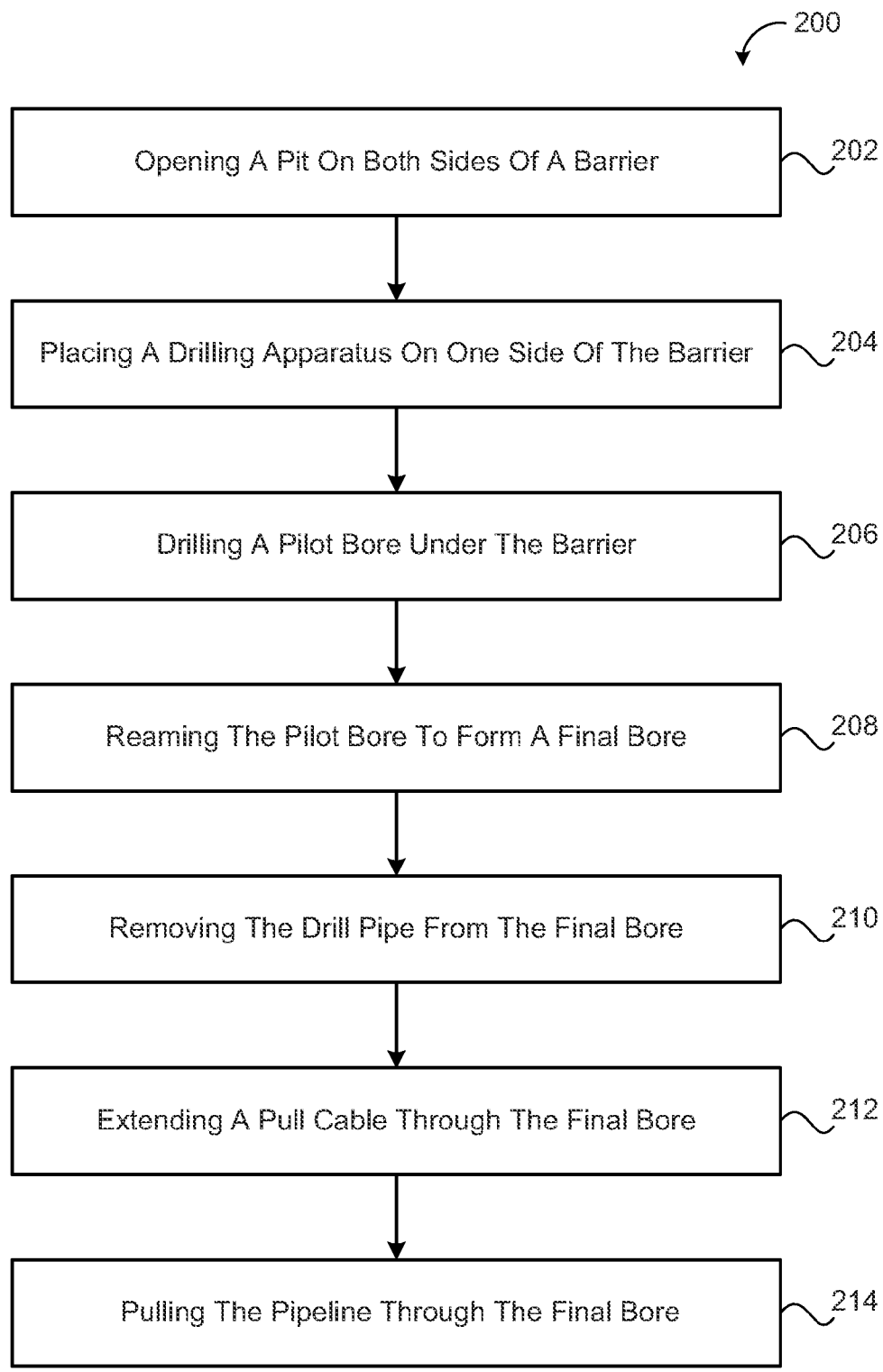
FIG. 2 provides an exemplary arrangement of operations for installing a pipeline under a barrier.

Once the pilot bore 12 is formed, the operations further include reaming 208 the pilot bore 12 to form a passageway or final bore 14 of sufficient size to allow one or more sections of pipe 30 to be pushed or pulled lengthwise through the final bore 14 from one side of the barrier 10 to the other (see e.g., FIG. 1B). The reaming process 208 may entail pushing or pulling a reamer 56 attached to the rotating drill pipe 52 through the pilot bore to enlarge the pilot bore 12. Moreover, drill fluid 60 can be pumped to the reamer 56 through the drill pipe 52. Several passes using successively larger reamers 56 may be needed to achieve a passageway or final bore 14 of a threshold diameter $D_F$.

After the final bore 14 has been achieved and the reamer has passed through it completely, the operations may include executing a mud pass or packer reamer to clean the final bore 14 of all excavated material and to allow the drill fluid 60 to at least substantially fill the final bore 14, so as to allow for a smooth lubricated pull back of the drill pipe 52, avoiding friction of the pull section.

Figure 1C:
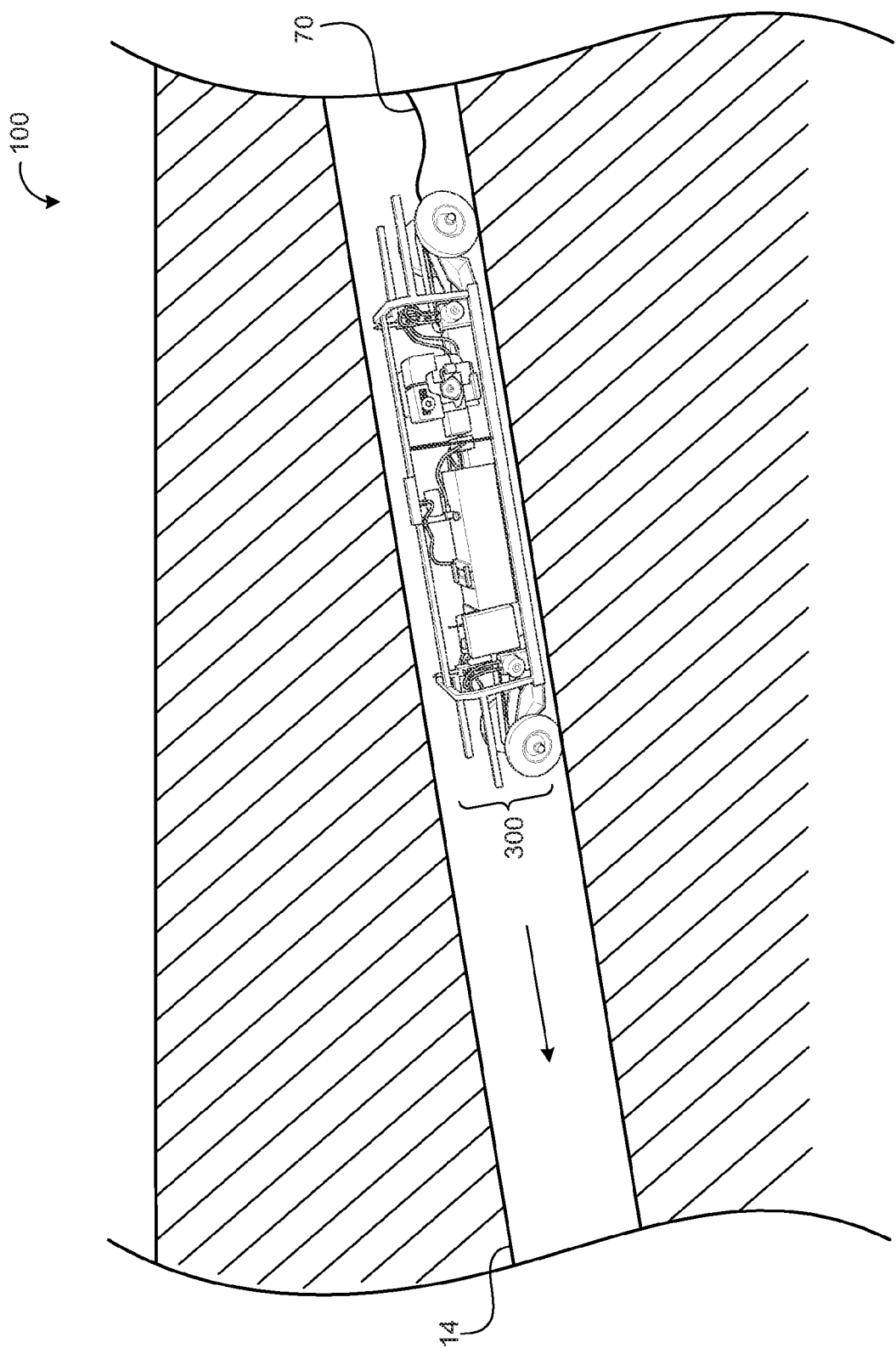
FIG. 1C is a schematic view of an exemplary remote controlled vehicle pulling a cable through a bored tunnel.
Figure 1D:
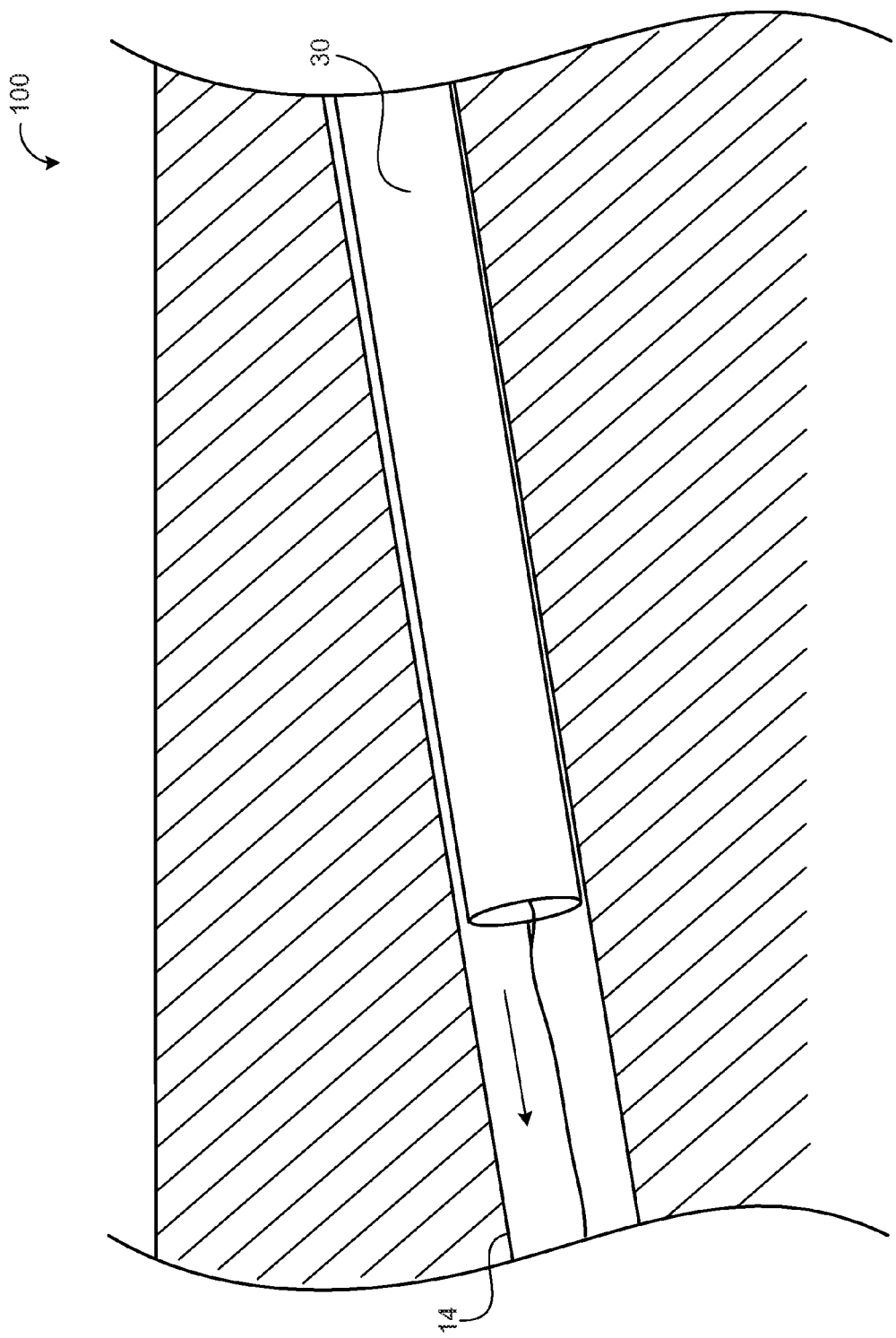
FIG. 1D is a schematic view of an exemplary pipeline being pulled through a bored tunnel.

The operations include removing 210 the drill pipe 52 from the final bore 14 and extending 212 a pull cable 70 through the final bore 14 (see e.g., FIG. 1C). The operations include attaching the pull cable 70 to a pipeline 30 and pulling 214 the pipeline 30 through the final bore 14 (see e.g., FIG. 1D). Depending on the size of the pipe, an artificial buoyancy measure might be taken so as to keep the pipeline 30 close to neutral buoyancy. If no measures are taken, several problems may occur (e.g., coating damage from the pipeline 30 floating in drill fluid 60 and causing excess friction that results in incurring more pull forces). In some examples, the buoyancy control is implemented by pumping water into the pipeline 30 and checking the gallons of water pumped.

Referring to FIGS. 3-12, the operation of extending 212 the pull cable 70 through the final bore 14 may be implemented by driving a remote controlled vehicle 300 with the pull cable 70 attached thereto through the final bore 14. The remote controlled vehicle 300 can provide an efficient manner for extending the pull cable 70 through the final bore 14. Moreover, the remote controlled vehicle 300 can eliminate any need for a human or animal to pass through the final bore 14 (e.g., for safety concerns).

In some implementations, the remote controlled vehicle 300 includes a chassis 310 that supports a drive system 400 in communication with a controller 500. In the example shown, the drive system 400 includes a hydraulic power unit 410 in communication with (e.g., hydraulically coupled to) at least one hydraulic drive 420 and at least one mobility element 430, such as a wheel or track, coupled to the at least one hydraulic drive 420. In some implementations, the hydraulic power unit 410 is in communication with (e.g., hydraulically coupled to) at least one front hydraulic drive 420a and at least one rear hydraulic drive 420b, each supported on corresponding front and rear portions 310a, 310b of the chassis 310.

Referring to FIGS. 3 and 7-10, in some implementations, the hydraulic power unit 410 includes a motor 412 (e.g., 3 GPM, 2000 psi, 3450 rpm) driving a fluid pump 414 (e.g., a single or dual stage displacement pump) in fluid communication with a reservoir 416 (e.g., 5 gallons) of hydraulic fluid (e.g., oil or water). The hydraulic power unit 410 may communicate with the controller 500 to receive power commands. In some implementations, the controller 500 controls a speed and flow direction of the pump 414 (e.g., by controlling the motor 412) to control a speed and drive direction (e.g., direction of rotation) of the hydraulic drives 420a, 420b. For example, the pump 414 may be driven at a specified rate and in a specified direction of fluid flow (e.g., in accordance with a received drive command from the controller 500) to deliver a flow of fluid in a specified flow direction to the hydraulic drives 420a, 42b. In additional examples, hydraulic power unit 410 includes front and rear control valves 418a, 418b for controlling the direction and/or amount of fluid flow to the corresponding front and rear hydraulic drives 420a, 420b.

Hydraulic drives (e.g., hydraulic rotary drive systems) can be divided into two basic types: 1) traction drives and 2) non-traction drives. In the example shown, the hydraulic drives 420 are traction drives (or propel drives) for propelling the driven vehicle 300. A direction of drive shaft rotation can be changed instantly with equal output torque in either direction. Although the vehicle 300 is shown with a wheeled drive system 400, the drive system 400 may also be implemented with driven tracks (e.g., with traction hydraulic drives coupled to right and left skid steer tracks supported by the chassis 310).

The hydraulic drives 420 may be either open loop or closed loop circuits. In an open loop circuit, oil is returned to the reservoir 416 before returning to the motor 412 or pump 414. The motor/pump circuit is open to atmosphere. In an open loop circuit, the drive speed of the motor 412 may be controlled by varying the flow with a valve, changing a pump input speed (engine or pump input speed), or varying a flow using a variable displacement type of pump 414. In such cases, counter-balance valves may be employed to accomplish dynamic braking functions, and provide a flow (pressure) source to release a spring applied, hydraulic release brake. In some examples, a shuttle valve for directing flow may be used to release the spring applied pressure-release brake. The shuttle valve may be a double check valve that directs flow from an A or B side of the loop and may be the source of flow to create the pressure to release a brake.

In a closed loop circuit, there is no reservoir between the inlet and outlet of the motor 412 and pump 414. The outlet of the pump 414 is connected directly to the motor inlet and the motor outlet is connected directly to the pump inlet. This circuit is, in theory, closed to atmosphere. Motor speed is typically controlled using the variable displacement pump 416. This pump 416 can also control motor output shaft direction (CW or CCW rotation). These systems provide dynamic control of flow through the closed loop of the motor/pump circuit. They may be, however, subject to some inherent internal leakage that results in the inability of the loop to hold a load over time. As a result, a static brake may be used to mechanically hold the load. The static brake may include a mechanical caliper, disc or ball-ramp type brakes. In addition, a spring-applied, hydraulic release brake may be used.

In some implementations, each hydraulic drive 420 includes a traction sensor 422 (e.g., torque sensor) for detecting a loss of traction above a threshold level. The controller 500 receives a signal from the traction sensor 422 and alters a drive command to the hydraulic power unit 410 or the respective hydraulic drive 420 to regain traction. For example, upon detecting a loss of traction in the front hydraulic drive 420a, the controller 500 reduces a drive speed of the affected hydraulic drive 420a to regain traction.

Referring to FIGS. 5, 7, 8, 11 and 12, in some implementations, the front and rear hydraulic drives 420a, 420b are each coupled to a respective front and rear axle 450a, 450b (e.g., via sprocket and chain or belt). At least one wheel 430 is mounted (e.g., rigidly) on each axle 450a, 450b, which can each rotate with respect the chassis 310. In other implementations, a wheel 430 is coupled to a shaft of each hydraulic drive 420a, 420b. For example, right and left front wheels 430 are coupled to respective right and left front hydraulic drives 420a and right and left rear wheels 430 are coupled to respective right and left rear hydraulic drives 420b. Such an arrangement can provide four independently driven wheels 430.

Figure 6:
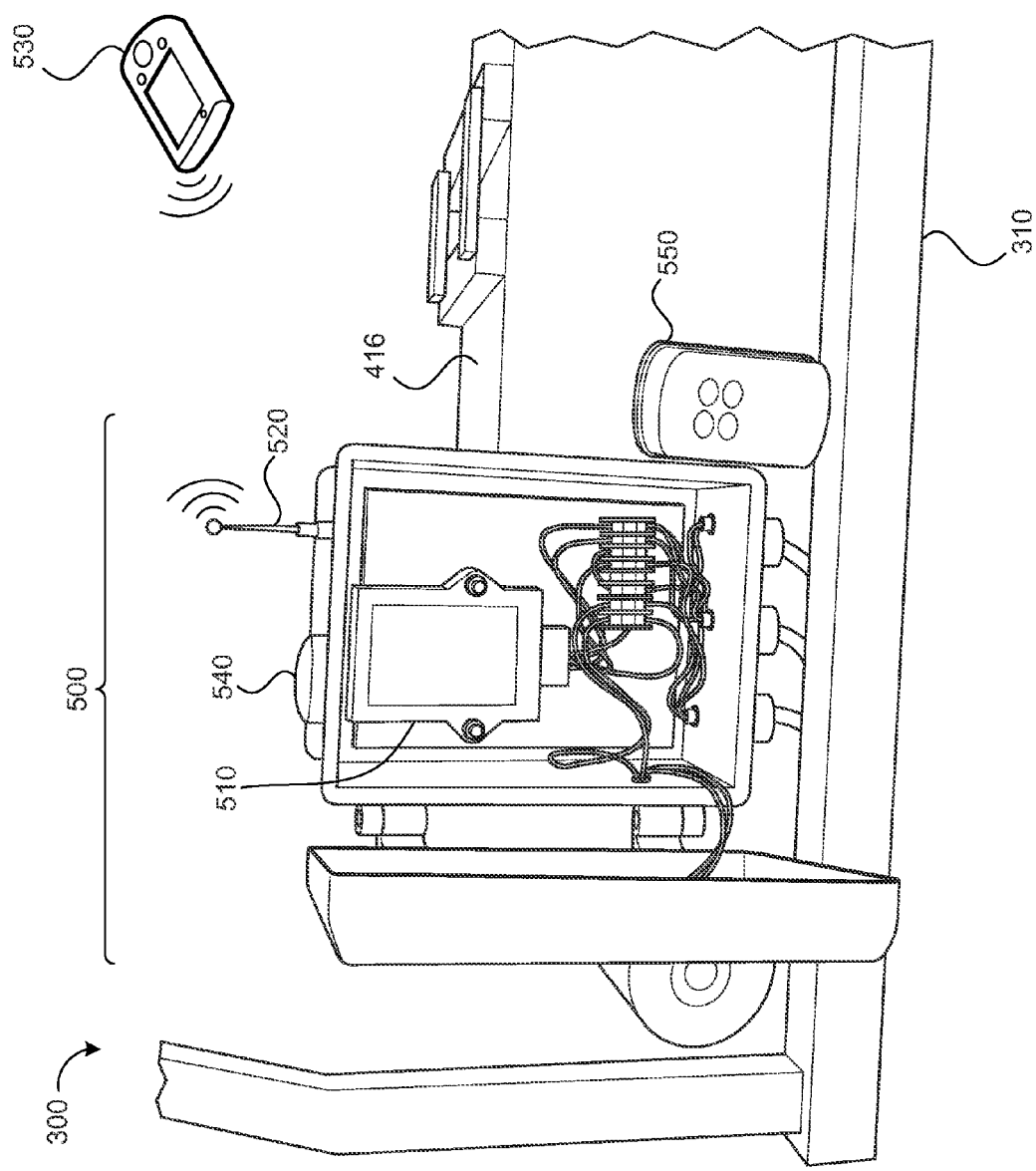
Figure 7:
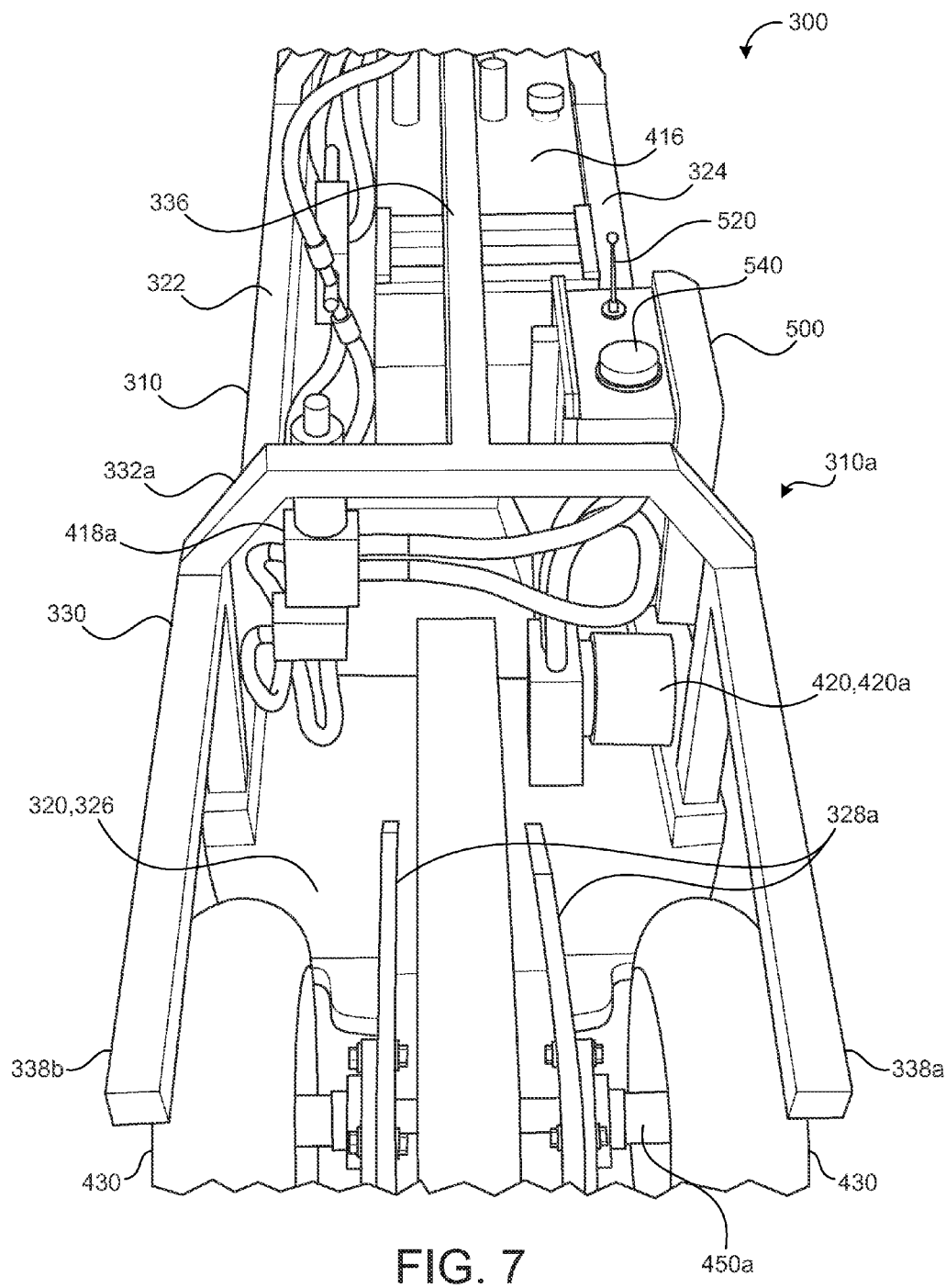
FIGS. 7 and 8 are partial perspective views of the remote controlled vehicle shown in FIG. 3, illustrating an exemplary hydraulic power system.
Figure 8:
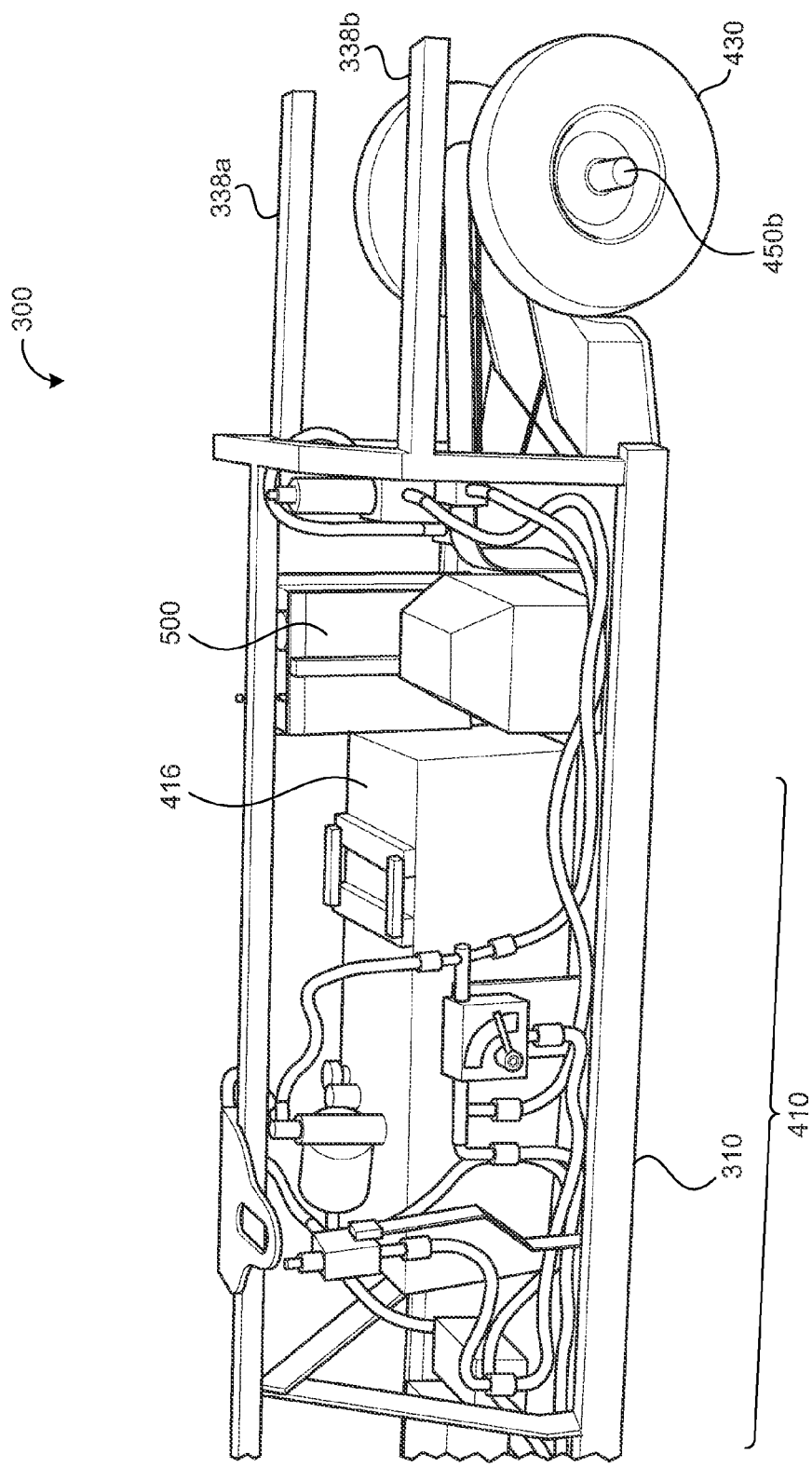
Figure 9:
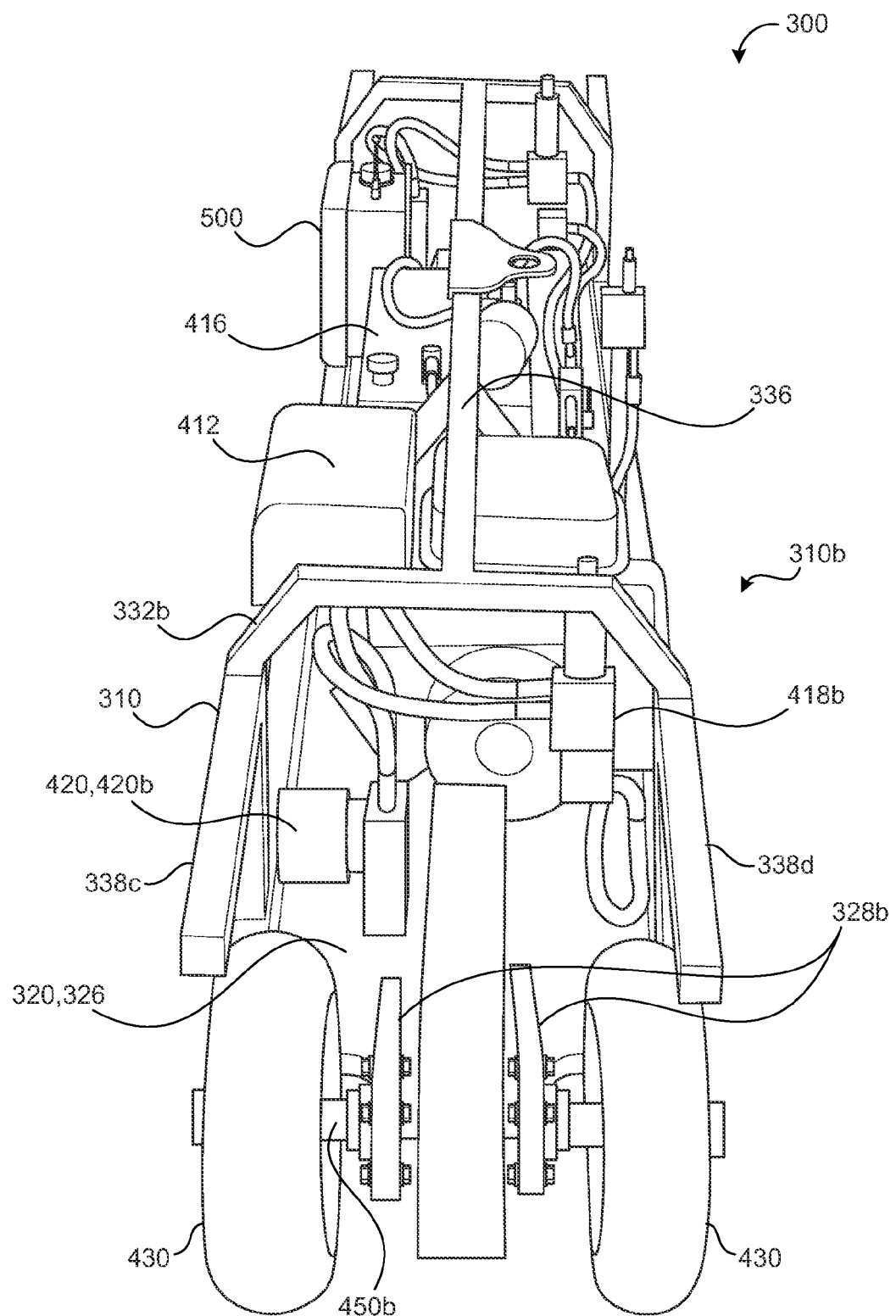
FIG. 9 is a front view of the remote controlled vehicle shown in FIG. 3.
Figure 10:
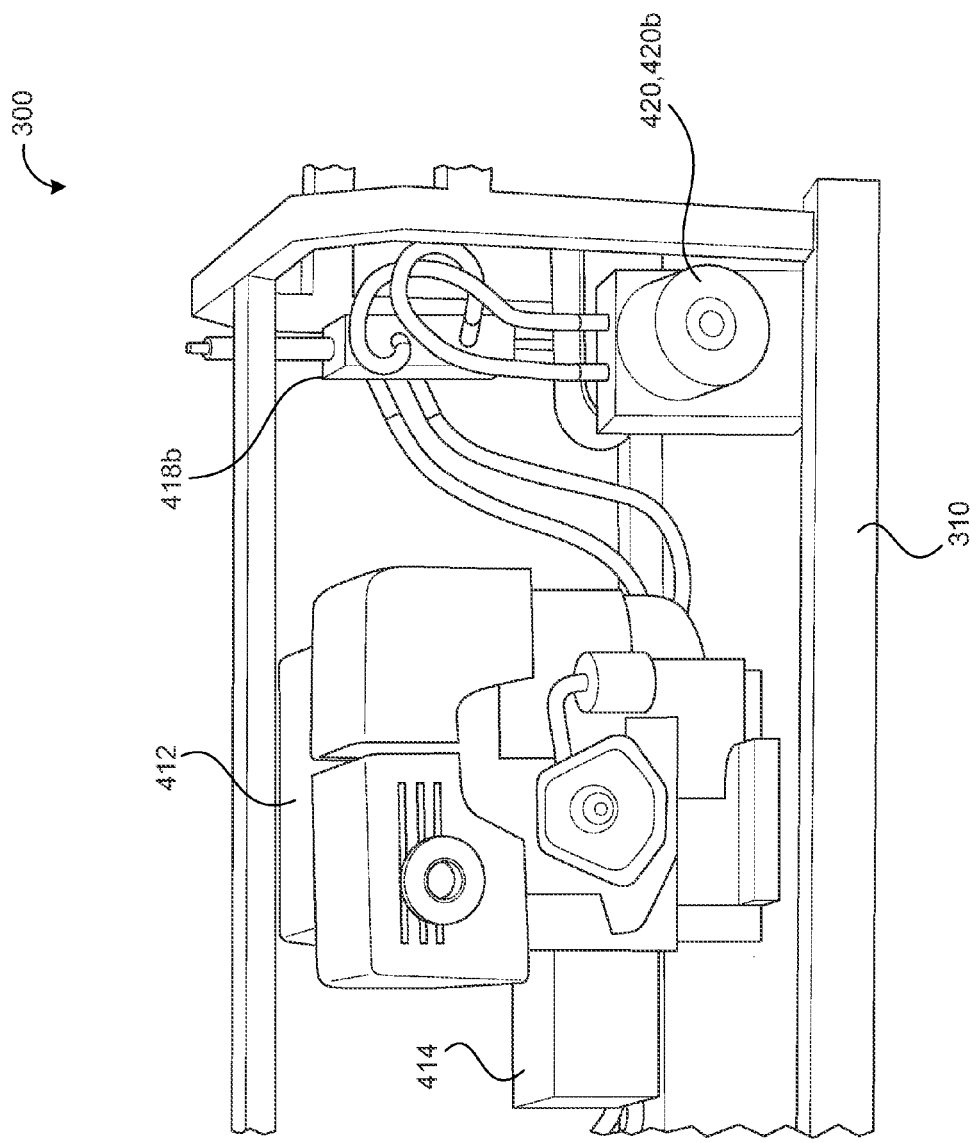
FIG. 10 is a rear view of the remote controlled vehicle shown in FIG. 3.
Figure 11:
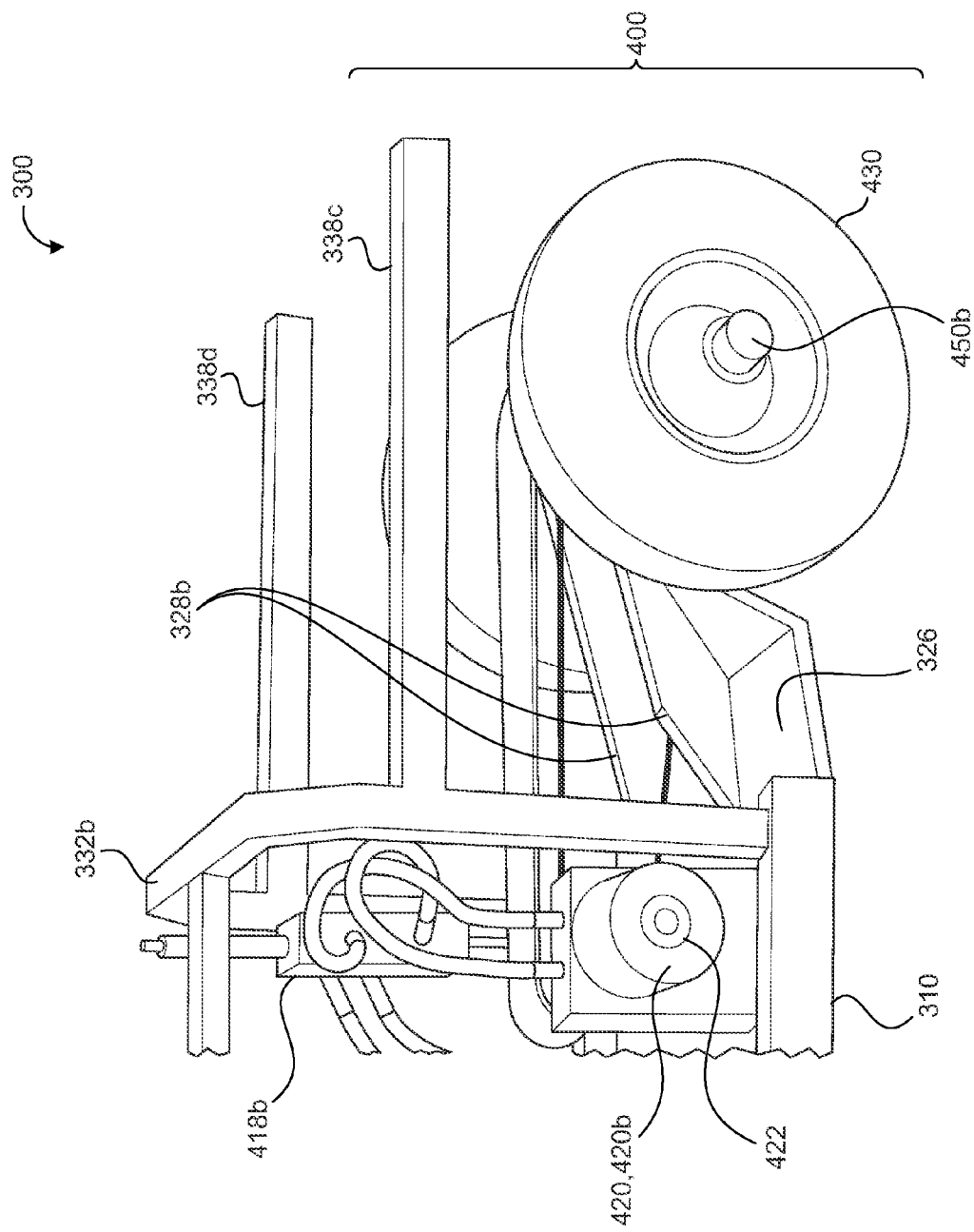
FIGS. 11 and 12 are partial perspective views of a rear portion of the remote controlled vehicle shown in FIG. 3.
Figure 12:
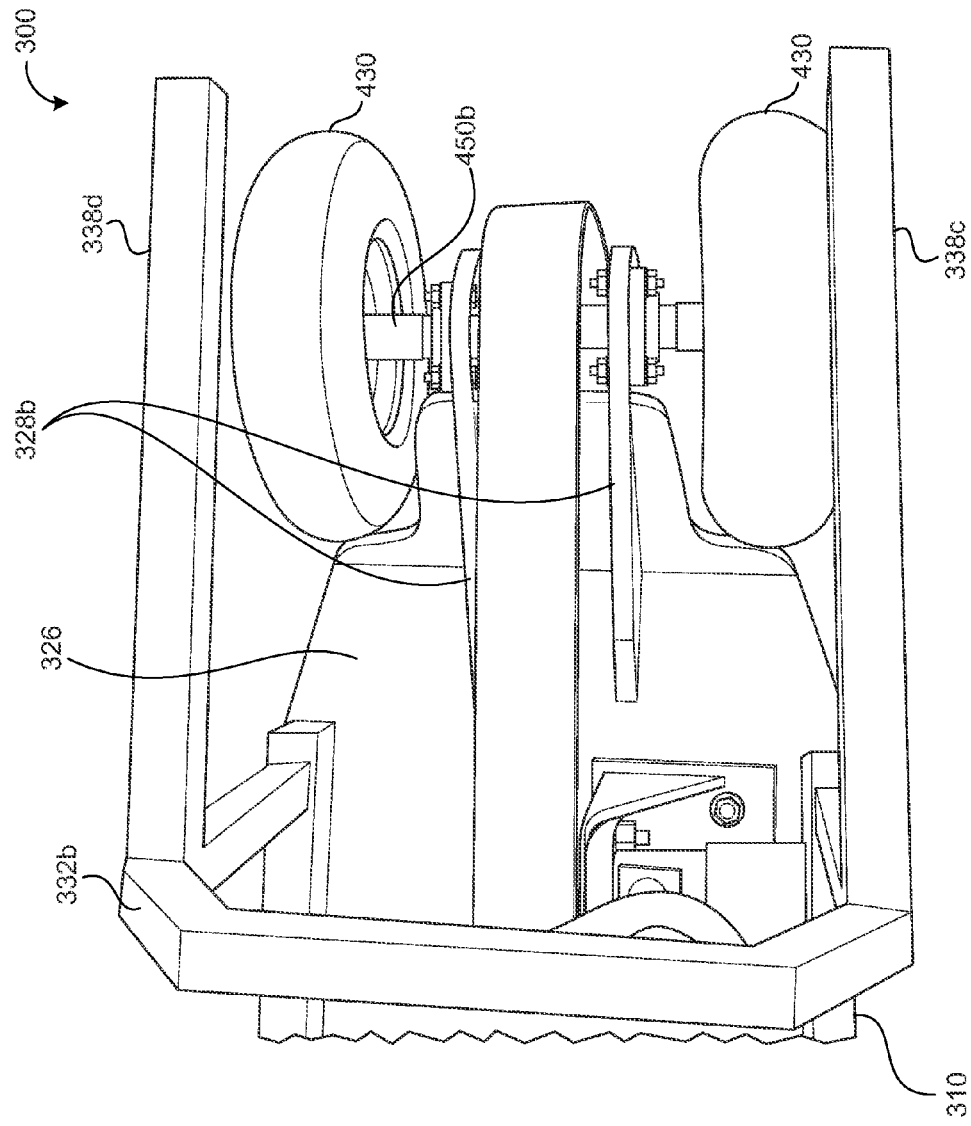

Referring to FIGS. 6 and 7, the controller 500 includes a processor 510 in electrical communication with a receiver/transmitter 520, which communicates with a remote controller 430 external to the vehicle 300 (e.g., a hand held device). A user can issue drive commands on the remote controller 530, which sends the commands (e.g., via wireless, radio frequency (RF), microwave, infrared (IR), Wi-Fi, laser, etc.) to the receiver/transmitter 520 of the vehicle controller 500. The processor 510 receives the commands and issues drive commands to the hydraulic drive units 420a, 420b, accordingly. In the example shown, the controller 500 includes an emergency stop button 540 (e.g., mounted on top of the controller 500), so that a user can stop the vehicle 300 without the use of the remote controller 530. Actuation of the emergency stop button 540 can sever power to the hydraulic drive units 420a, 420b, initiate breaking of the hydraulic drive units 420a, 420b, and/or completely shut-down the entire drive system 400 of the vehicle 300. The vehicle 300 may also include an onboard command unit 550, which provides a user interface (e.g., buttons, display, touch screen, etc.) to allow the user to issue drive commands, set and/or monitor operating properties or parameters of the drive system 400, etc. without the use of the remote controller 530.

Referring again to FIGS. 3, 5, 7, 9 and 11, in some implementations, the chassis 310 defines an elongated shape by having a length $L_C$ of between about 80 inches and about 160 inches (e.g., about 122 inches) and a width $W_C$ of between about 10 inches and about 30 inches (e.g., about 19 inches). The chassis 310 can be made of steel or any other relatively rigid material. The chassis 310 may include a base frame 320 attached to a body frame 330. The base frame 320, in some examples, includes first and second lengthwise supports 322, 324 spaced parallel from each other and at least one cross support 326 connected between the first and second lengthwise supports 322, 324. The cross support 326 may be a platform or plate for supporting components of the drive system 400. In the example shown, the base frame 320 includes front and rear drive supports 328a, 328b for supporting the corresponding front and rear axles 450a, 450b. Bearings can be press-fit in or otherwise coupled to the front and rear drive supports 328a, 328b to support the front and rear axles 450a, 450b. The axles 450a, 450b can be sized such that the wheels 430 coupled thereto do not extend beyond the width $W_C$ of the chassis 310. This allows the vehicle 300 to maintain a width no greater than the width $W_C$ of the chassis 310, in some examples, so as to minimize the risk of the wheels 430 contacting the walls of the final bore 14, which could lead to the vehicle 300 becoming wedged within the final bore 14. The vehicle 300 can be sized to fit within and traverse through the final bore 14 without a likelihood of getting stuck.

In some examples, the body frame 330 at least partially encloses or surrounds the drive system 400 and/or controller 500 to prevent external items from catching on components of the drive system 400 or the controller 500. As shown, the body frame 330 may include front and rear substantially U-shaped supports 332a, 332b spaced parallel from each other and connected to respective front and rear portions 320a, 320b of the base frame 320. The body frame 330 may also include at least one cross support 336 connected between the front and rear substantially U-shaped supports 332a, 332b. In the examples shown, the body frame 330 includes first and second lift arms 338a, 338b disposed on the front substantially U-shaped support 332a and spaced parallel from each other. The body frame 330 may also include third and fourth lift arms 338c, 338d disposed on the rear substantially U-shaped support 332b and spaced parallel from each other. The lift arms 338a, 338b, 338c, 338d can be used for lifting and transporting the remote controlled vehicle 300. Moreover, one or more of the lift arms 338a, 338b, 338c, 338d can be positioned over the wheels 330 to protect the wheels 330 from falling objects.

Figure 3:
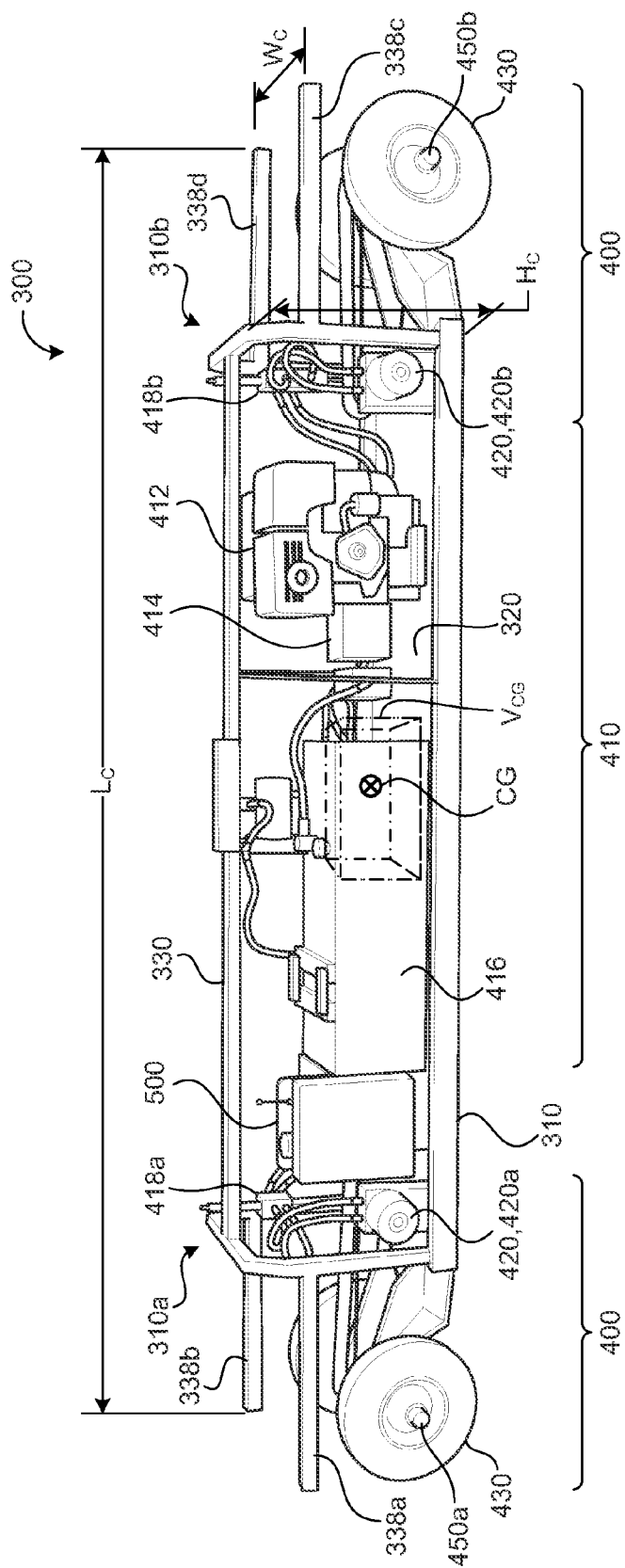
FIG. 3 is a perspective view of an exemplary remote controlled vehicle.
Figure 4:
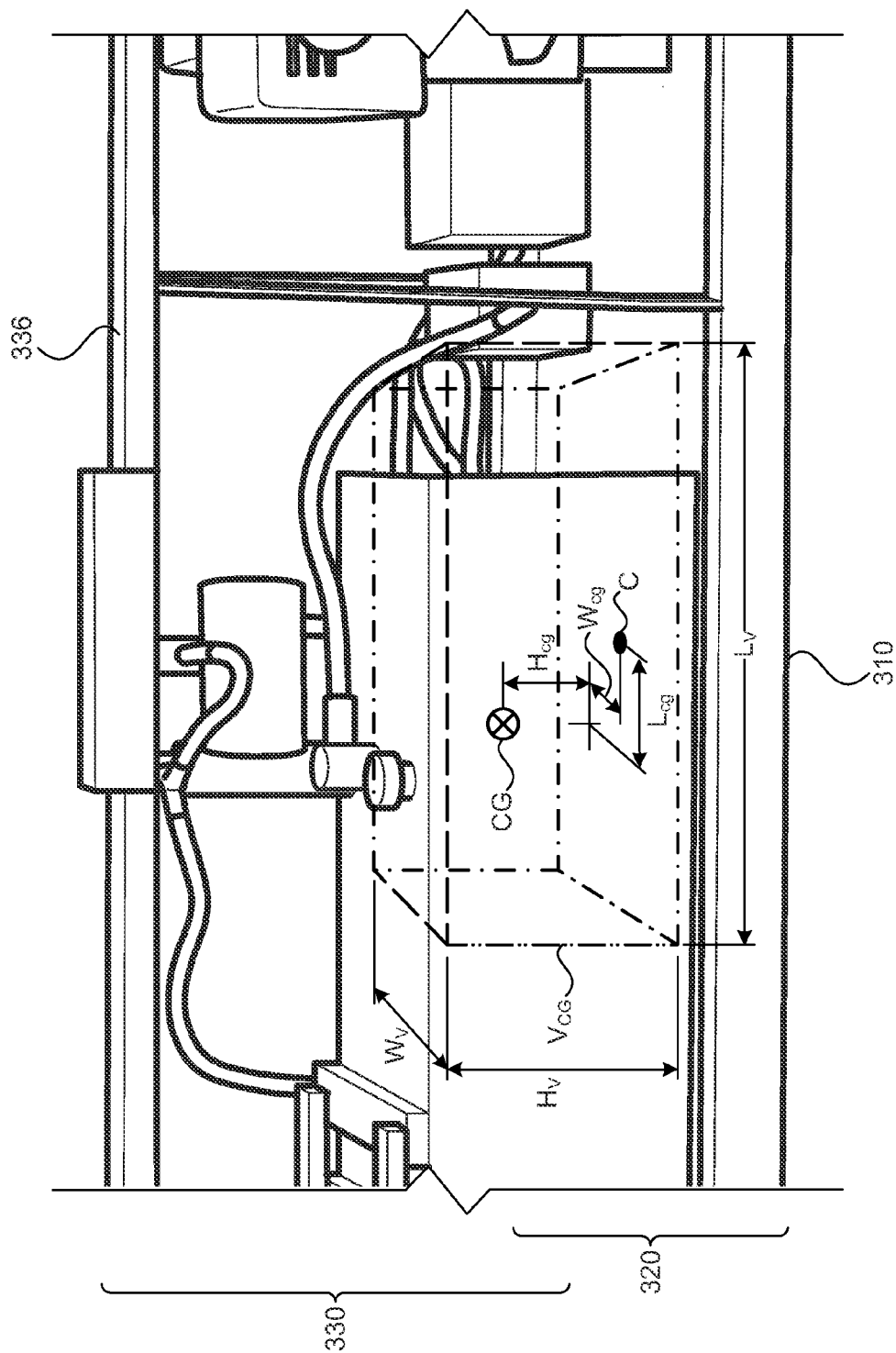
FIG. 4 is a partial perspective view of the remote controlled vehicle shown in FIG. 3.
Figure 5:
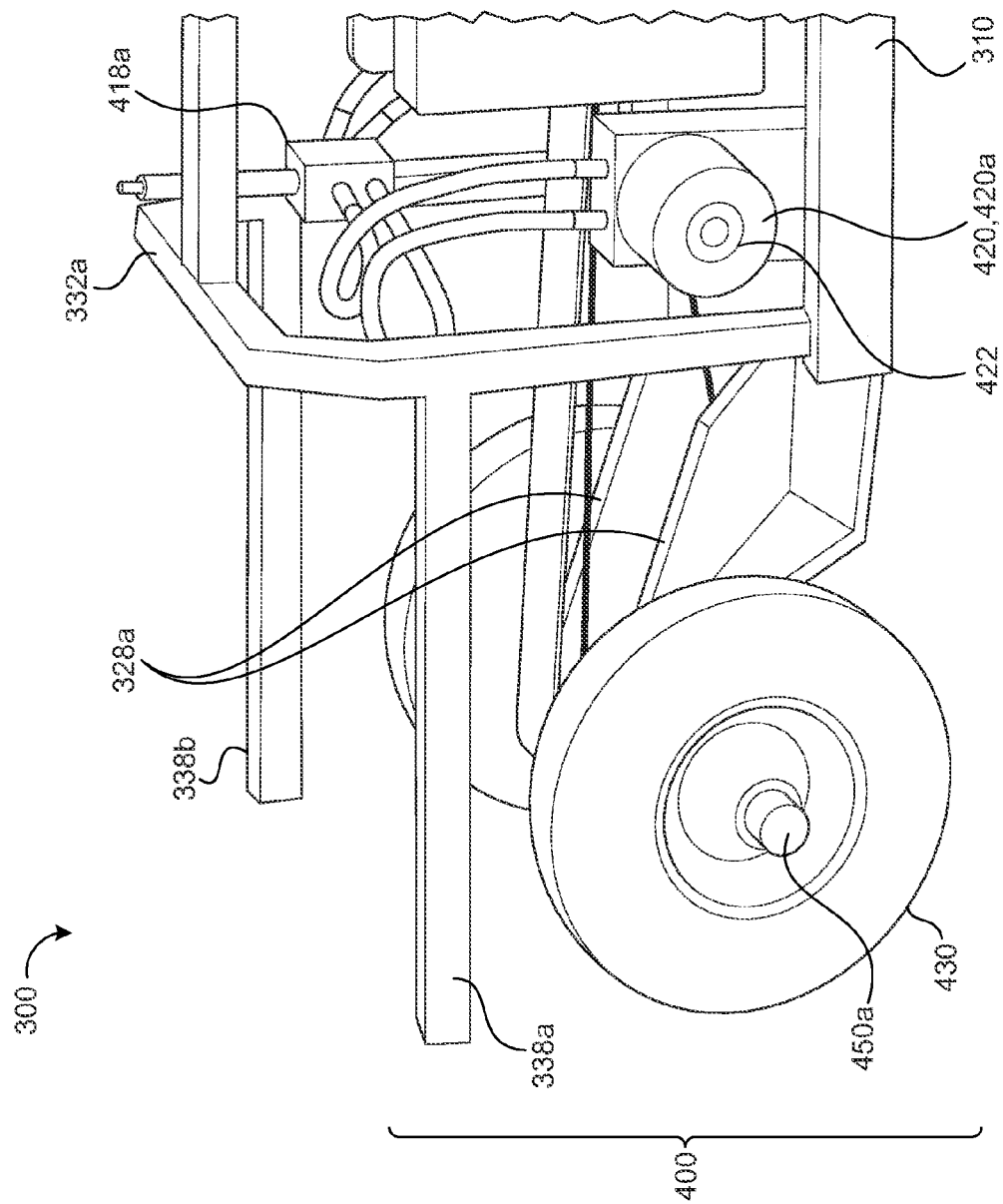
FIG. 5 is a partial perspective view of a front portion of the remote controlled vehicle shown in FIG. 3.

Referring to FIGS. 3 and 4, together, the base frame 320 and the body frame 330 may be sized so that the chassis 310 has a height $H_C$ of between about 10 inches and about 30 inches (e.g., about 19 inches). The length $L_C$, width $W_C$, height $H_C$ of the chassis 310 can be sized to allow the vehicle 300 to traverse the final bore 14 without getting stuck. In some examples, the width $W_C$ of the chassis 310 is less than or equal to ⅙ the length $L_C$ of the chassis 310. In additional examples, the height $H_C$ of the chassis 310 is less than or equal to ⅙ the length $L_C$ of the chassis 310. Moreover, the components of the vehicle 300 can be arranged to provide a relatively low center of gravity and/or a weight distribution amenable to maintaining traction (e.g., even weight distribution).

In some examples, the chassis 310 has a relatively low center of gravity CG located at a height $H_{cg}$ above about a center C of the base frame 320 of between about 1/8 and about 1/3 of the height $H_C$ of the chassis 310. In other examples, the center of gravity CG is located at a height $H_{cg}$ above the base frame 320 of between about 1/8 and about 1/3 of the height $H_C$ of the chassis 310, a length $L_{cg}$ from the center C of the base frame 320 of between about 1/4 and about 1/2 of the length $L_C$ of the chassis 310 (e.g., between about 1/8 and about 1/4 of the length $L_C$ of the chassis 310) and a width $W_{cg}$ from the center C of the base frame 320 of between zero and 1/2 of the width $W_C$ of the chassis 310 from the center C of the base frame 320. In additional examples, the center of gravity CG is located within a CG-volume $V_{CG}$ having length $L_V$ of between about 1/8 and about 1/2 of the length $L_C$ of the chassis 310, a width $W_V$ of between about 1/8 and about 1/2 of the width $W_C$ of the chassis 310, and height $H_V$ of between about 1/8 and about 1/2 of the height $H_C$ of the chassis 310. The CG-volume is centered and sitting on the base frame 320.

The components of the vehicle 300 (e.g., drive system 400) can be arranged on the chassis 310 to attain a particular weight distribution, location of center of gravity CG, and/or to fit within a particular morphology, shape, or size of the chassis 310. In the examples shown, the controller 500 is disposed on or near the front portion 310a of the chassis 310 forward of the hydraulic power unit 410. The components of the hydraulic power unit 410 can be disposed in series along the chassis 310 (e.g., in a line, rather than side-by-side) to provide a substantially even distribution of weight on the chassis 310 and to maintain the long slender shape of the vehicle 300. In some examples, the controller 500, the reservoir 416, the motor 412 and the pump 414 are disposed in series along the chassis 310, so that the chassis 300 can have a width $W_C$ substantially equal to the widest width of the reservoir 416 and the motor 412 (or the widest width of the reservoir 416 and the motor 412 plus a clearance width). For example, the reservoir 416 can be disposed on the chassis 310 rearward of the controller 500 and forward of the pump 414 and motor 412. The pump 414 may be disposed on the chassis 310 forward of the motor 412. The front and rear hydraulic drives 420a, 420b can be disposed on the respective front and rear portions 310a, 310b of the chassis 310 substantially near the respective front and rear axles 450a, 450b.

The chassis 310 may include at least one cable receiver 340 disposed on at least one of the base frame 320 and the body frame 330. The cable receiver 340 may be an aperture defined by the base frame 320 or the body frame 330 and/or a hook or clasp. In the example shown, the front portion 320F and the rear portion 320R of the base frame 320 both define apertures that form cable receivers 340.

A number of implementations have been described. Nevertheless, it will be understood that various modifications may be made without departing from the spirit and scope of the disclosure. Accordingly, other implementations are within the scope of the following claims.

What is claimed is:

1. A method of directional drilling, the method comprising:
   forming first and second pits spaced from each other;
   forming a pilot bore from the first pit to the second pit;
   enlarging the pilot bore to a final bore;
   extending a cable through the final bore between the first and second pits by attaching the cable to a remote controlled vehicle;
   driving the remote controlled vehicle through the final bore from one of the pits to the other pit by issuing a drive command from a remote controller external to the vehicle and receiving the drive command in a vehicle controller, the vehicle controller controlling a drive system of the vehicle according to the received drive command; and
   pulling a pipeline through the final bore using the cable;
   wherein the vehicle controller controls a hydraulic power unit in communication with front and rear hydraulic drives supported on corresponding front and rear portions of a chassis of the vehicle, each hydraulic drive driving a corresponding mobility element.

2. The method of claim 1, wherein the remote controller communicates the drive command to the vehicle controller using a radio frequency communication.

3. The method of claim 1, wherein the vehicle controller controls a motor of the hydraulic power unit to drive a pump in fluid communication with the hydraulic drives.

4. The method of claim 1, wherein the vehicle controller controls front and rear control valves in fluid communication with the corresponding front and rear hydraulic drives to regulate at least one of a fluid direction and a fluid flow through each control valve to each corresponding hydraulic drive.

5. The method of claim 1, wherein each hydraulic drive comprises a hydraulic traction drive.

6. The method of claim 1, further comprising attaching the cable to a chassis of the remote controlled vehicle;
   wherein the chassis has a length of between about 80 inches and about 160 inches, a width of between about 10 inches and about 30 inches, and a height of between about 10 inches and about 30 inches for moving through tunnels; and
   wherein the remote controlled vehicle has a center of gravity disposed within a volume having a length of between about 1/8 and about 1/2 of the length of the chassis, a width of between about 1/8 and about 1/2 of the width of the chassis, and a height of between about 1/8 and about 1/2 of the height of the chassis, the volume centered and sitting on the chassis.

7. The method of claim 1, further comprising forming the pilot bore between about 6 inches and about 12 inches.

8. The method of claim 1, further comprising delivering drilling fluid into the pilot bore to aid formation of the pilot bore.

9. The method of claim 1, further comprising reaming the pilot bore with a rotating reamer to enlarge the pilot bore to the final bore.

* * * * *